United States Patent
Feldmann et al.

(10) Patent No.: US 6,234,255 B1
(45) Date of Patent: May 22, 2001

(54) ADJUSTABLE STROKE FOR A RECIPROCATING SAW

(75) Inventors: Martin Feldmann, Gurnee, IL (US); Vance E. Roe, Jackson, TN (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/373,148

(22) Filed: Aug. 12, 1999

(51) Int. Cl.[7] .................................................. B23D 49/04
(52) U.S. Cl. .............................. 173/114; 30/393; 30/394; 74/60
(58) Field of Search .................................... 173/114, 205, 173/29, 47, 48; 30/392–394; 74/60, 50

(56) References Cited

U.S. PATENT DOCUMENTS

| | | | |
|---|---|---|---|
| 3,461,732 | 8/1969 | Gregory | 74/60 |
| 3,945,120 | 3/1976 | Ritz | 30/93 |
| 4,031,763 | * 6/1977 | Eisenberg | 74/50 |
| 5,025,562 | 6/1991 | Palm | 30/392 |
| 5,050,307 | 9/1991 | Palm | 30/392 |
| 5,103,565 | 4/1992 | Holzer, Jr. | 30/392 |
| 5,555,626 | 9/1996 | Fuchs | 30/392 |
| 5,644,846 | * 7/1997 | Durr et al. | 30/393 |
| 5,689,891 | 11/1997 | Bednar, et al. | 30/394 |
| 5,725,058 | 3/1998 | Eriksson | 173/114 |

* cited by examiner

Primary Examiner—Scott A. Smith
(74) Attorney, Agent, or Firm—Greer, Burns & Crain, Ltd.

(57) ABSTRACT

An adjustable cutting stroke length is provided by a wobble plate mechanism. A wobble plate mechanism imparts reciprocating linear action to a working end of a reciprocating motorized tool. A drive source is included that has an axially rotatable main drive shaft that is selectively rotatable in one of two opposite directions. The main drive shaft is configured to engage a wobble mechanism that provides the reciprocating linear action to the tool's working end. One of a first stroke and a second stroke is provided to the working end of the tool by the wobble mechanism. When rotation of the main drive shaft occurs in a first direction, the working end is provided with a first stroke. Furthermore, when rotation of the main drive shaft occurs in a second direction, the working end is provided with a second stroke. Elements used for adjusting the stroke length are placed on one axis only.

32 Claims, 4 Drawing Sheets

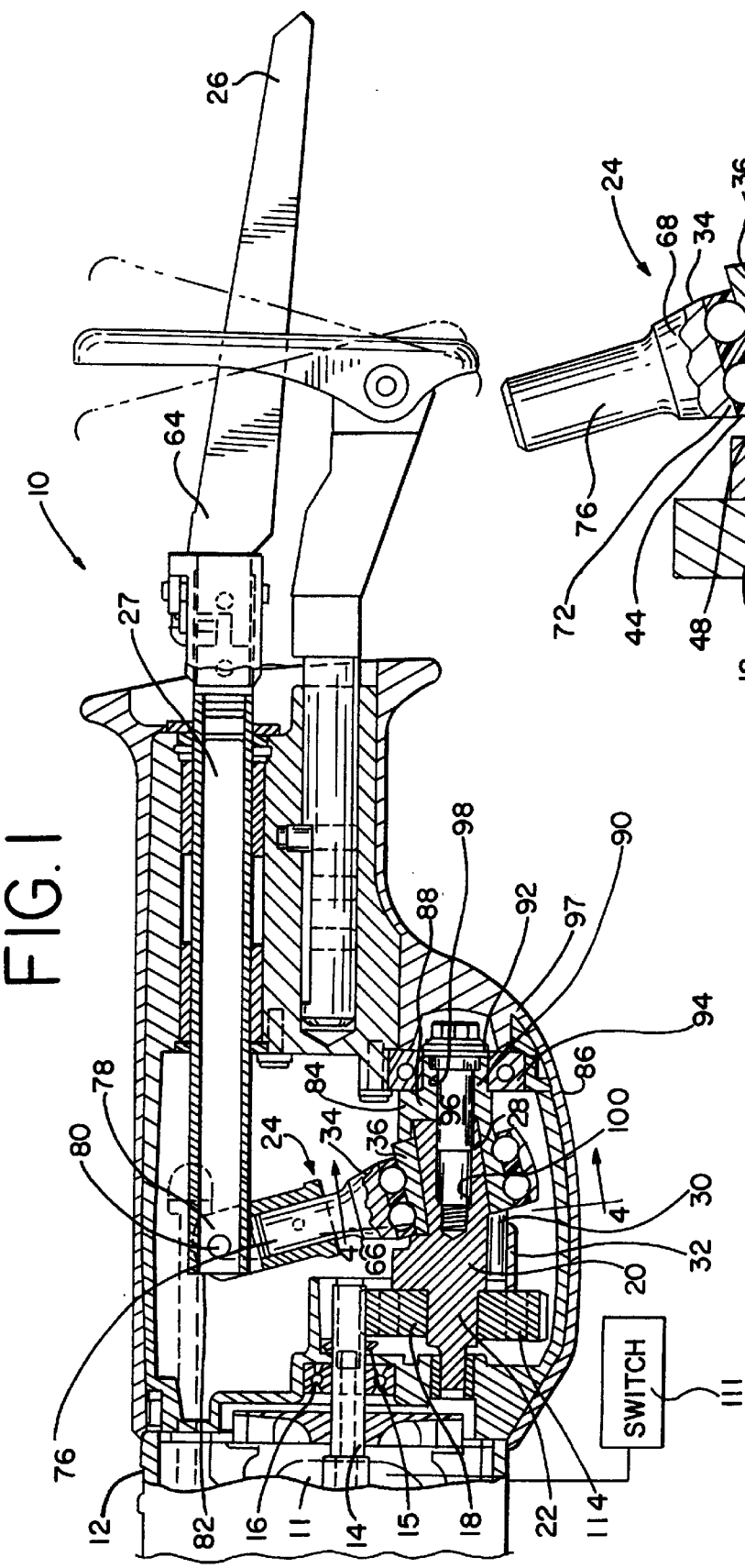
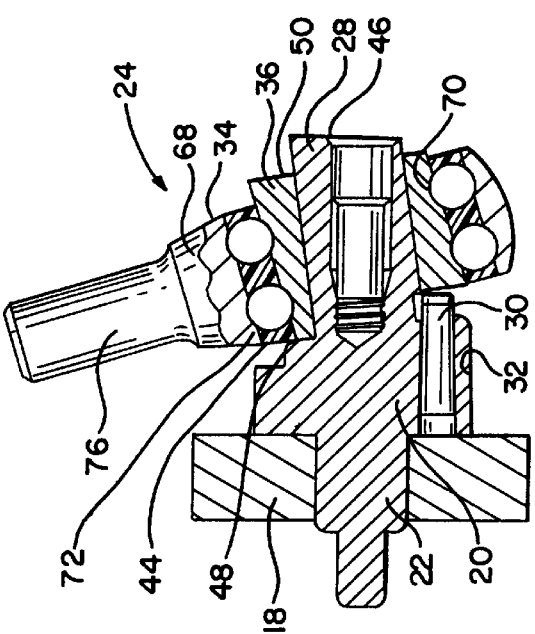
FIG. 1
FIG. 2

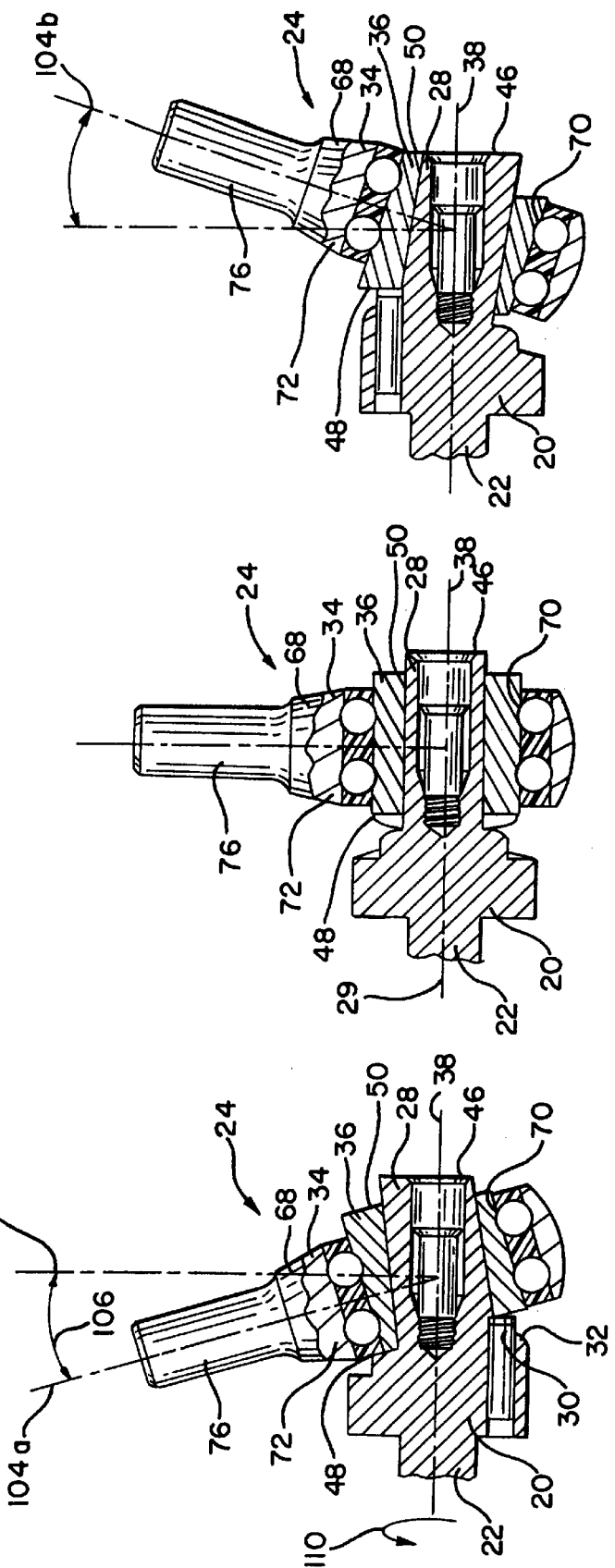

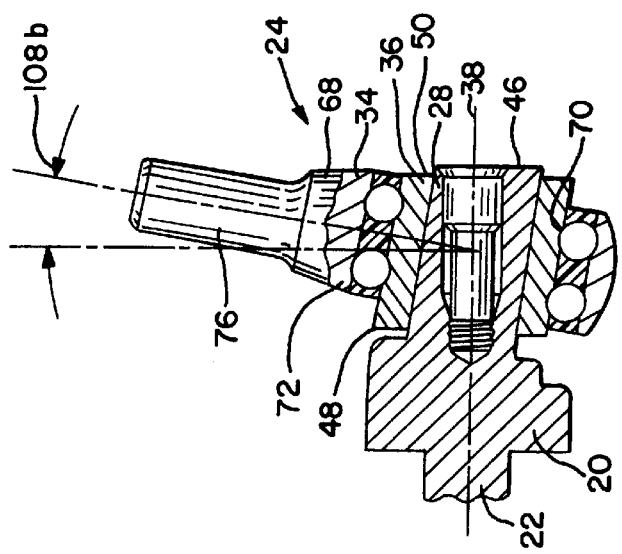
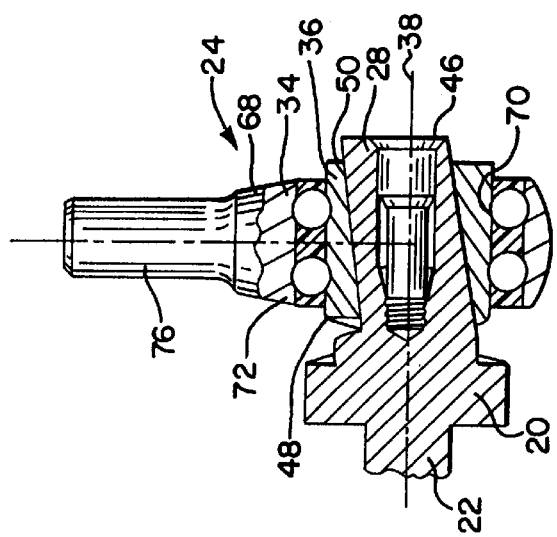
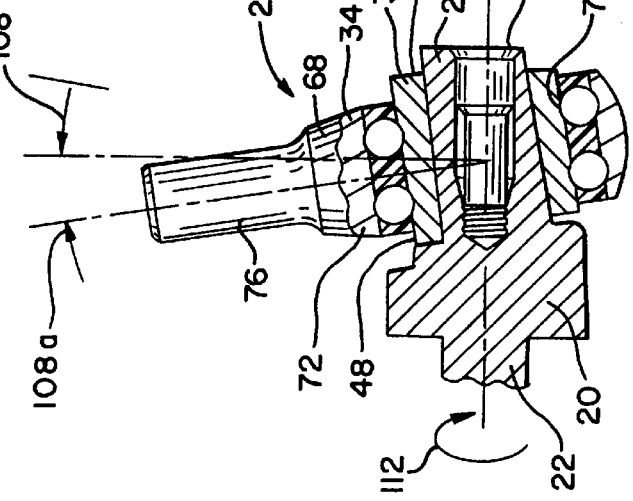

ADJUSTABLE STROKE FOR A RECIPROCATING SAW

FIELD OF THE INVENTION

The present invention relates generally to drive systems for power tools having reciprocating work elements, and specifically to a mechanism for driving a reciprocating saw blade to have varying stroke lengths.

BACKGROUND OF THE INVENTION

Hand held, reciprocating power tools such as saws are known in which a wobble mechanism translates rotary motion of a motor shaft into reciprocating linear motion of a plunger. A saw blade is attached to one end of the plunger.

U.S. Pat. No. 3,945,120 issued to Ritz discloses improvements in hand-held, electric motor driven so called "all purpose" reciprocating saws. In Ritz, a reciprocating saw is provided which produces an orbital blade action. With this action there is a generally forward or "pushing" component for returning the blade to the cutting position, and a generally rearward or "pulling" component to perform cutting. The orbital movement is designed to generate more force in the cutting stroke to better cut wood.

The purpose of the Ritz device is to provide a plurality of angular stroke patterns to adjust the degree of orbital movement of the saw blade. A disadvantage in Ritz is that the linear cutting stroke length is constant.

Another disadvantage in Ritz is that two axes are required to provide a wobble motion. The first axis of the Ritz wobble mechanism, embodied in a wobble drive shaft, for providing linear reciprocation, has a fixed axial orientation and is not adjustable. The second axis of the Ritz wobble mechanism is an eccentric shaft which is transverse to the wobble drive shaft and provides the orbital component of the blade motion. The reciprocating motion of a plunger bearing the blade must be coordinated with the plunger's orbital movement. In Ritz, when the direction of the motor is reversed, the only effect occurs in the eccentric shaft, not in the wobble drive shaft. In this manner, the orbital stroke is varied.

U.S. Pat. No. 5,555,626 to Fuchs also discloses a reciprocating tool drive mechanism with a two part orbital movement. A wobble arm is used to drive the plunger of a power tool. An eccentric, axially-oriented with the wobble arm, provides the orbital movement.

Fuchs does not disclose or suggest adjusting the cutting stroke length. In contrast, Fuchs provides an orbital motion that is only manually adjustable, and the wobble angle is not adjustable at all.

In using reciprocating saws, a short stroke length is desirable for a slower cut, such as in plumbing and electrical work, where precision of the cut is critical. A long stroke length is useful for a fast cut, such as in cutting wood or in building or renovating work, where speed is more desirable than precision.

Thus, there is a need for a reciprocating saw which incorporates a drive system providing linear reciprocating motion. There is also a need for a reciprocating saw that provides an adjustable cutting stroke mechanism. Thus, one product may be used in a variety of work applications.

Therefore, it is an object of the present invention to provide a motorized tool incorporating a drive system providing linear reciprocating motion which can be used to provide both shorter, precise stroke lengths, as well as longer stroke lengths.

Another object of the present invention is the provision of a drive system for a motorized tool which generates a multi-stroke reciprocating motion about a single axis.

SUMMARY OF THE INVENTION

The above identified objects are met or exceeded by the present adjustable stroke for a reciprocating saw. The present invention provides a wobble plate mechanism for a reciprocating saw that provides an adjustable cutting stroke length. A feature of the present drive system is that the elements used for adjusting the stroke are disposed on one axis only. The stroke length is varied by changing the rotational direction of the drive motor.

More specifically, the present invention provides a tool having a working end with reciprocating linear action. A drive source is included having an axially rotatable main drive shaft that is selectively rotatable in one of a first direction, and a second direction opposite the first direction. A wobble mechanism is operatively engaged with the main drive shaft and is configured for providing the reciprocating linear action to the tool's working end. The wobble mechanism is configured for providing one of a first stroke and a second stroke to the tool's working end. The first stroke is provided when the main drive shaft is rotating in the first direction. Moreover, the second stroke is provided when the main drive shaft is rotated in the second direction

BRIEF DESCRIPTION OF THE DRAWINGS

FIG. 1 is a fragmentary sectional view of a drive system for a power tool incorporating the present invention;

FIG. 2 is an enlarged sectional view of the wobble mechanism depicted in FIG. 1.

FIGS. 6A–6C are fragmentary, sequential partial sectional views of the wobble mechanism of FIG. 2 having a first, relatively long stroke; and FIGS. 6D–6F are fragmentary, sequential partial sectional views of the wobble mechanism of FIG. 2 having a second, relatively short stroke.

DESCRIPTION OF A PREFERRED EMBODIMENT

Figure 5:
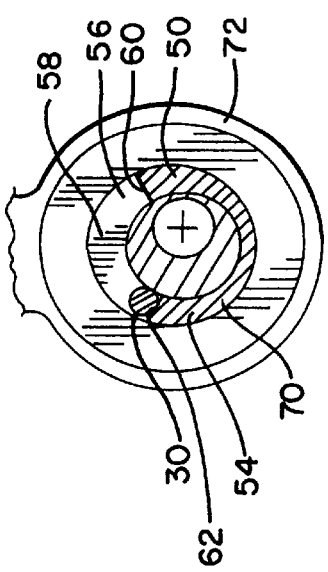
FIG. 5 is a cross sectional view taken along the line 4—4 of FIG. 1 and in the direction indicated generally, depicting a second position.

Referring particularly to FIG. 1, a reciprocating motorized tool, generally designated 10, includes a motor housing 12. The tool 10, illustrated as a saw, however other types of known reciprocating tools are contemplated. A drive source 11 in the tool 10, such as an electric motor, has an axially rotatable main drive shaft 14 supported at a free end by a bearing 16. The axially rotatable main drive shaft 14 rotates in a first direction or in a reverse second direction depending on the rotational direction of the drive source 11. A pinion gear 15 is securely engaged by a needle bearing on a free end of the main drive shaft 14 to rotate therewith. A gear 18, meshes with, and is driven by the pinion gear 15, and is pressed upon a first end 22 of a wobble plate drive shaft 20.

The wobble plate drive shaft 20 is one of the major components of a wobble mechanism, generally designated 24.

In general, the wobble mechanism 24 is operatively engaged with the main drive shaft 14 and is configured for providing reciprocating linear action to a working end 26 of the tool 10. In a preferred embodiment, the working end 26 is a rod-like plunger 27. The wobble mechanism 24 is configured for providing one of a first stroke and a second stroke to the working end 26 of the tool 10. "Stroke" is defined as the distance between a retracted position and an extended position of the working end 26 of tool 10 as driven by the wobble mechanism 24. An important feature of the present invention is that the wobble mechanism 24 is configured so that the first stroke is provided to the working end 26 when the main drive shaft 14 is rotated in a first direction, and the second stroke is provided to the working end 26 when the main drive shaft 14 is rotated in a second direction. Thus, by reversing rotational direction of the drive shaft 14, the stroke of the tool 10 may be varied.

A second end 28 of the wobble plate drive shaft 20 is angled relative to the first end 22, which is generally parallel to the main drive shaft 14 and defines an axis of rotation 29. As more clearly seen in FIG. 2, the wobble plate drive shaft 20 also includes a pin 30 that projects parallel to the first end 22 from a radially enlarged integral collar 32 which separates the first and second ends 22 and 28. The pin 30 is disposed on the collar 32 to be located adjacent to the second end 28 of the wobble plate drive shaft 20. In a preferred embodiment, the pin 30 is configured to be driven into and frictionally retained in the collar 32, however, other known fastening technologies are contemplated, including welding, chemical, adhesives, and epoxies.

Figure 3:
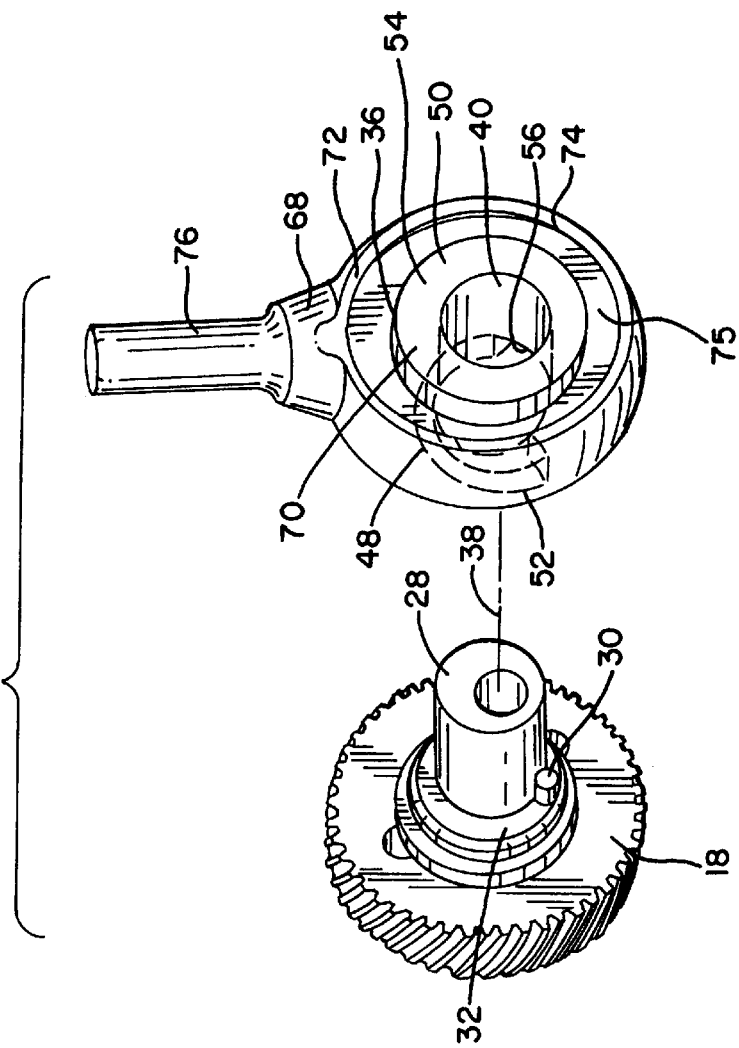
FIG. 3 is an exploded perspective view of the wobble mechanism of FIG. 2, specifically illustrating a second end of the wobble plate drive shaft angled to engage a reciprocally angled throughbore of a sleeve to provide the wobble mechanism.

Referring to FIGS. 2 and 3, a wobble plate assembly 34 is matingly engaged on the second end 28 of the wobble plate drive shaft 20 and includes a sleeve 36 having a central axis 38 and a throughbore 40 angled relative to the central axis. The throughbore 40 is angularly configured to complement the angular orientation of the second end 28 of the wobble plate drive shaft 20. The throughbore 40 is constructed and arranged to preferably be at an angle in the range of approximately 0° and 8° relative to the axis 38. In the preferred embodiment, the angle is 8.2°. Similarly, the second end 28 of the wobble plate drive shaft 20 is preferably constructed and arranged to have a corresponding angular orientation in the range of approximately of 0° and 8°. While a 8° angle for these components is preferred, it will be understood that other angular orientations may be provided to suit the particular application. As will be described below, an important feature of the present invention is that the sleeve 36 may be axially rotated relative to the second end 28 of the shaft 20 to alter the degree of wobble movement generated by the wobble mechanism 24.

Referring now to FIGS. 2 and 3, the wobble plate assembly 34 is provided with a first side 44 and a second side 46, and the sleeve 36 includes a first side 48 and a second side 50. Each of the first side 48 and the second side 50 of sleeve 36 has a corresponding first cam portion, 52 and second cam portion 54, extending axially from the respective first side 48 and second side 50 of the sleeve 36. Furthermore, each of the cam portions 52 and 54 is respectively oriented 180° out of phase relative to the other. On the first cam portion 52, material has been removed to define a slot 56 (best seen in FIGS. 4 and 5). In a preferred embodiment, the slot 56 occupies an apex 58 of the cam portion 52. It will be noted that the wobble mechanism 24 is configured to be driven and to generate the reciprocating linear action by a mechanism on one axis.

Figure 4:
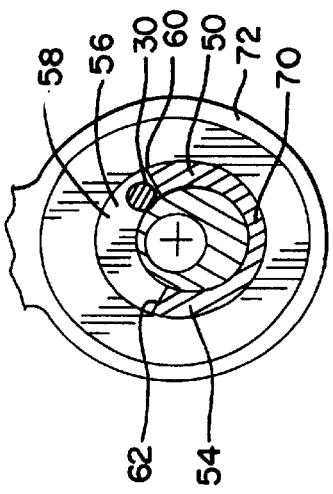
FIG. 4 is a cross sectional view taken along the line 4—4 of FIG. 1 and in the direction indicated generally, depicting a first position.

Referring now to FIGS. 4 and 5, it will be seen that a first stop 60 and a second stop 62 define ends of the slot 56. The pin 30 is constructed and arranged to move in the slot 56 between the first and second stops 60 and 62. Engagement of the first stop 60 occurs when the axially rotatable main drive shaft 14 is rotated in the first direction to provide the first stroke to the plunger 27, to which a saw blade 64 is releasably mounted as is known in the art. The pin 30 is further constructed and arranged to engage the second stop 62 of the slot 56 when the axially rotatable main drive shaft 14 is rotated in the second or reverse direction to provide the second stroke to the plunger 27 that accommodates the saw blade 64.

As seen in FIG. 1, also included on the wobble plate assembly 34 is a bearing 66 for facilitating the rotation of the sleeve 36 relative to a wobble arm 68. Preferably a ball bearing, the bearing 66, as more clearly seen in FIG. 3, includes an inner race 70, an outer race 72, and a plurality of balls 74 positioned between the inner and outer races 70 and 72 in a known fashion. Lubricant such as light grease is retained within the bearing 66 by a pair of annular cages 75. The inner race 70 is formed on an outer surface of the sleeve 36, and the outer race 72 is preferably formed on an inner surface of the wobble arm 68. It is also contemplated that the inner and outer races 70 and 72 could be separate components. Opposite the outer race 72, the wobble arm 68 is provided with a generally vertically projecting stem 76. As seen in FIG. 1, the stem is dimensioned to be matingly engaged in a socket 78 which is pivotally secured at a point 80 to an end 82 of the plunger 27 which is opposite the saw blade 64.

As seen in FIG. 1, a spacer 84 is also included in the wobble mechanism 24. The spacer 84 is engaged on the second end 28 of the wobble plate drive shaft 20. At a first end 86, the spacer 84 has a mass 88 for receiving the second cam portion 54 of the sleeve 36. Opposite the first end 86, a second end 90 is provided with an axially projecting annular boss 92 which mates with a bearing 94. The bearing 94, preferably a ball bearing, supports the wobble plate assembly 34 in the housing 12.

A threaded fastener 96 slidingly engages a throughbore 98 in the spacer 84, and threadably engages an axial bore 100 with the second end 28 of the wobble drive shaft 20. It will be seen that the angular orientation of the second end 28 may be measured relative to the bore 100, which is in registry with the axis of rotation of the wobble drive shaft 20. The threaded fastener 96 also retains the wobble mechanism 24 in a front portion 97 of the housing 12.

Referring now to FIGS. 6A–6C, a first stroke 104 is obtained by the second end 28 of the wobble plate drive shaft 20 being oriented relative to the throughbore 40 of the sleeve 36 to result in a cumulative summation of at least a portion of the angular displacement of the throughbore 40 of sleeve 36 and at least a portion of the angular orientation of the second end 28 of wobble plate drive shaft 20. This orientation occurs as seen in FIG. 4, when the pin 30 engagably rotates with the shaft 20 until it engages the first stop 60 in the slot 56.

At that point, as seen in FIGS. 6A–6C, the pin's engagement with the slot 56 causes the sleeve 36 to rotate with the shaft 20 at the respective maximum displacement orientation depicted in FIG. 6A. The relative orientation of the sleeve 36 and the shaft 20 is determined by the placement of the slot 56 on the sleeve. In FIG. 6A, the relative position of the shaft 20 and sleeve 36 is such that the maximum angular displacement of the two components is achieved, through the angular summation described above. Also, FIG. 6A, depicts the stem 76 at the limit 104a of its linear travel in a rear direction (to the left). Further rotation of the wobble plate drive shaft 20 in the first direction will cause the stem 76 to trace an arc 106 as the sleeve 36 rotates relative to the shaft 20 causing the wobble arm 68 to trace a linear reciprocating wobble pattern as is known in the art.

Referring now to FIG. 6B, the second end 28 of the wobble plate drive shaft 20 has rotated 90° to its mid-stroke position, causing the stem 76 to be mid-way in its linear stroke. Also note that in this position, the wobble plate drive shaft 20 is generally aligned with the axis 29. Referring to FIG. 6C, still further rotation of the wobble plate drive shaft 20 to 180° from the position of FIG. 6A causes the stem 76 to reach the forward limit 104b of its linear stroke. Note that both the second end 28 of the wobble plate drive shaft 20 and the sleeve 36 are still in a cumulative displacement condition, caused by the constant engagement of the pin 30 with the stop 60. A full rotation of the wobble plate drive shaft 20 will bring the stem 76 back to the position of FIG. 6A.

Referring now to FIGS. 6D–6F, when the drive source 11 is reversed, so that the wobble plate drive shaft rotates in a second or reverse direction, the pin 30 also travels in the slot 56 in the second direction to engages the second stop 62, as seen in FIG. 5. A second stroke 108, as seen in FIGS. 6D–6F, is obtained by a balancing summation of the angular orientation of the second end 28 of wobble plate drive shaft 20 and the angular displacement of the throughbore 40 of the sleeve 36. By "balancing summation" is meant that the sleeve 36 and the second shaft end 28 are oriented relative to each other so that the eccentricities of their rotation offset each other to achieve less than full displacement.

Thus, as seen in FIGS. 6D–6F, as the second shaft end 28 rotates through 180° degrees, as described above in relation to FIGS. 6A–6C, the second stroke 108 is shorter than the first stroke 104. As the pin 30 continues its engagement with the second stop 62, this relative orientation of the second shaft end 28 to the sleeve bore 40 is maintained. More specifically, the angular orientation of the second end 28 of wobble plate drive shaft 20 is preferably at an angle in the range of between 0° and 8° and the angular displacement of the throughbore 40 of sleeve 36 is preferably at a reciprocal angle in the range of between 0° to 8°.

It will be seen as illustrated in FIGS. 4, 5, and 6A–6F, that the stroke may be varied by changing the orientation of the slot 56 on the sleeve 36, and also by changing the angular orientation of the second shaft end 28 and the through bore 40. The configuration of the throughbore 40 of the sleeve 36 with the second end 28 of wobble plate drive shaft 20 creates the wobble motion.

In operation of the tool 10, as seen in FIGS. 1 and 6A–6C, it will be seen that powering the drive source 11 in a first direction 110 will cause rotation of axially rotatable main drive shaft 14 in the first direction 110. Rotation is imparted to the pinion gear 15 to drive the gear 18. Teeth 114 on the gear 18 rotatably engage the wobble drive shaft 20 to rotate reciprocally in the first direction 110, as seen in FIGS. 6A–6C. Upon rotation of the wobble plate drive shaft 20, as seen in FIG. 4, the pin 30 engages first stop 60 of slot 56 to toggle the sleeve 36 such that the resulting angle at which the wobble plate assembly 34 reciprocates provides the first stroke 104, as seen in FIGS. 6A–6C, to plunger 27 that accommodates the saw blade 64. The reciprocating angle of the wobble plate assembly 34 is at a maximum, as seen in FIGS. 6A–6C, when the wobble plate drive shaft 20 is rotated in first direction 110. When a reversible switch 111 of the drive source 11 is adjusted to the second direction 112, as seen in FIGS. 6D–6F, the wobble drive shaft 20 is caused to rotate in a second reverse direction 112. Upon rotation of the wobble plate drive shaft 20 in the second direction 112, as seen in FIG. 5, the pin 30 engages the second stop 62 to toggle the sleeve 36 such that the resulting angle at which the wobble plate assembly 34 reciprocates provides second stroke 108 to plunger 27 that accommodates saw blade 64. As seen in FIGS. 16D–6F, the resulting angle of reciprocation of wobble plate assembly 34 is at a minimum when wobble plate drive shaft 20 is rotated in second direction 112. Thus, a wobble mechanism for a reciprocating saw provides an adjustable cutting stroke length in a range between a specified minimum and maximum. Also provided is the wobble mechanism for a reciprocating saw that imparts an adjustable cutting stroke length derived from one axis.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

We claim:

1. A tool having a working end with reciprocating linear action comprising:
    a drive source having an axially rotatable main drive shaft being selectively rotatable in a first direction and a second direction opposite said first direction;
    a wobble mechanism operatively engaged with said main drive shaft and configured for providing said reciprocating linear action to said working end;
    said wobble mechanism being configured for providing one of a first stroke and a second stroke to said working end;
    said first stroke being provided when said main drive shaft is rotating in said first direction; and
    said second stroke being provided when said main drive shaft is rotated in said second direction, said first stroke being a different length than said second stroke such that the stroke length is varied by changing the rotational direction of said main drive shaft.

2. The tool of claim 1 wherein the wobble mechanism is configured to be driven and to generate said linear action about one axis.

3. The tool of claim 1 wherein the wobble mechanism comprises:
    a wobble plate drive shaft having a first end driven by said drive source through said main drive shaft, and a second end angled relative to said first end; and
    a wobble plate assembly having a rotating sleeve with a central axis and a throughbore angled relative to said axis, said through bore configured for engaging said second end for creating a wobble motion.

4. The tool of claim 3 wherein the wobble plate drive shaft further includes a pin projecting parallel to said first end and located adjacent said second end, said pin driven into said first end.

5. The tool of claim 4 wherein said wobble plate assembly has a first side and a second side, each said side of said wobble plate assembly having first and second cam portions extending respectively from said corresponding first and second sides.

6. The tool of claim 5 where said first and second cam portions have lobes oriented 180° out of phase from each other.

7. The tool of claim 6 wherein said lobe on said first cam portion defines a slot.

8. The tool of claim 7 wherein said slot occupies an apex of said lobe.

9. The tool of claim eight 8 wherein said slot includes a first stop and a second stop, and wherein said pin is constructed and arranged to engage said first stop when said main drive shaft is rotated in said first direction to provide said first stroke, and wherein said pin is constructed and arranged to engage said second stop when said main drive shaft is rotated in said second direction to provide said second stroke.

10. The tool of claim 3 wherein said angular orientation of said second end of said wobble plate drive shaft measured relative to said axis of rotation of said drive shaft is equal to said angular displacement of said throughbore relative to said central axis.

11. The tool of claim 10 wherein said first stroke is obtained by said second end of said wobble plate drive shaft being oriented relative to said throughbore to result in a cumulative summation of said angular displacement of said sleeve and said angular orientation, and said second stroke is obtained by a balancing summation of said angular displacement and said angular orientation.

12. The tool of claim 11 wherein said angular orientation of said second end of said wobble plate drive shaft is in the approximate range of 0° to 8° and wherein said angular displacement of said sleeve is in an approximate reciprocal range of 0° to 8°.

13. The tool of claim 3 further including a bearing for facilitating said rotation of said sleeve relative to said wobble plate assembly.

14. The tool of claim 13 wherein said bearing is a ball bearing having an inner race, an outer race and a plurality of ball bearings disposed therebetween.

15. The tool of claim 14 wherein said sleeve is said inner race of said bearing.

16. The tool of claim 15 wherein said wobble plate assembly includes a wobble arm and said wobble arm is said outer race of said bearing.

17. The tool of claim 3 wherein said wobble mechanism further includes a spacer engaged on said second end of said wobble plate drive shaft and wherein said spacer accommodates said angular orientation of said second end of said wobble plate drive shaft engaged about the angular displacement of said sleeve and further accommodates angular orientation of said second cam portion of said sleeve to allow said wobble plate assembly to rotate about said central axis of said sleeve.

18. A tool having a working end with reciprocating linear action comprising:
   a housing;
   a motorized drive source having an axially rotatable main drive shaft operatively engaging a gear;
   said gear rotatably engaging a wobble plate drive shaft having a first end driven by said drive source through said main drive shaft and a second end angled relative to said first end;
   a spacer engaged on said second end of said wobble plate drive shaft;
   a bearing secured to said housing configured to engage said spacer;
   said bearing rotatingly supporting said second end of said wobble plate drive shaft relative to said housing;
   a wobble plate assembly rotatably mounted on said wobble plate drive shaft, said wobble plate assembly having a rotating sleeve with a central axis and a throughbore angled relative to said axis, said throughbore configured for engaging said second end of said wobble plate drive shaft for creating a wobble motion about said central axis;
   said wobble motion providing said reciprocating linear action to said working end of said tool;
   said wobble plate assembly being configured for providing one of a first stroke and a second stroke to said working end of said tool;
   said first stroke being provided when said main drive shaft is rotating in a first direction; and
   said second stroke being provided when said main drive shaft is rotating in a second direction, said first stroke being a different length than said second stroke such that the stroke length is varied by changing the rotational direction of said main drive shaft.

19. The tool of claim 18 wherein said wobble plate drive shaft further includes a pin projecting parallel to said first end and located adjacent said second end of said wobble plate drive shaft, said pin driven into said first end of said wobble plate drive shaft.

20. The tool of claim 19 wherein said wobble plate assembly has a first side and a second side, each said side of said wobble plate assembly having first and second cam portions extending respectively from said corresponding first and second sides.

21. The tool of claim 19 where said first and second cam portions have lobes oriented 180° out of phase from each other.

22. The tool of claim 21 wherein said lobe on said first cam portion defines a slot.

23. The tool of claim 22 wherein said slot occupies an apex of said lobe on said first cam portion.

24. The tool of claim 23 wherein said slot includes a first stop and a second stop, said pin is constructed and arranged to engage said first stop when said main drive shaft is rotated in said first direction to provide said first stroke, and wherein said pin is constructed and arranged to engage said second stop when said main drive shaft is rotated in said second direction to provide said second stroke.

25. The tool of claim 18 wherein an angular orientation of said second end of said wobble plate drive shaft measured relative to said axis of rotation of said drive shaft is equal to an angular displacement of said throughbore of said sleeve relative to said central axis.

26. The tool of claim 18 wherein said first stroke is obtained by said second end of said wobble plate drive shaft being oriented relative to said throughbore to result in a cumulative summation of an angular displacement of said sleeve and an angular orientation of said second wobble plate drive shaft end, and said second stroke is obtained by a summation of said angular displacement and said angular orientation.

27. The tool of claim 26 wherein said angular orientation of said second end of said wobble plate drive shaft is in the approximate range of between 0° and 8° and wherein said angular displacement of said sleeve is at an approximate reciprocal range of between 0° and 8°.

28. The tool of claim 18 further including a bearing for facilitating said rotation of said sleeve relative to said wobble plate assembly.

29. The tool of claim 28 wherein said bearing is a ball bearing having an inner race, an outer race and a plurality of ball bearings disposed therebetween.

30. The tool of claim 29 wherein said sleeve is said inner race of said bearing.

31. The tool of claim 30 wherein said wobble plate assembly includes a wobble arm and said wobble arm is said outer race of said bearing.

32. The tool of claim 18 wherein said spacer accommodates said angular orientation of said second end of said wobble plate drive shaft engaged about the angular displacement of said sleeve and further accommodates said angular orientation of said second cam portion of said sleeve to allow said wobble plate assembly to rotate about said central axis of said sleeve.

* * * * *